United States Patent [19]

Whaley

[11] 4,188,016

[45] Feb. 12, 1980

[54] SPACER CARRIERS FOR FLOATING SEATS IN GATE VALVES

[75] Inventor: William L. Whaley, Houston, Tex.

[73] Assignee: ACF Industries, Incorporated, New York, N.Y.

[21] Appl. No.: 920,607

[22] Filed: Jun. 29, 1978

[51] Int. Cl.² ............................................. F16K 3/00
[52] U.S. Cl. .................................. 251/328; 251/167; 251/196
[58] Field of Search .............................. 251/328, 167

[56] References Cited

U.S. PATENT DOCUMENTS

| 2,906,491 | 9/1959 | Young | 251/167 |
| 3,823,911 | 7/1974 | Natho | 251/167 |
| 4,062,516 | 12/1977 | Grove | 251/328 X |
| 4,116,419 | 9/1978 | Diehl | 251/328 X |

*Primary Examiner*—Harold W. Weakley
*Attorney, Agent, or Firm*—Eugene N. Riddle

[57] ABSTRACT

A gate valve structure having a pair of opposed spacer carriers (72,74) fitting within the valve chamber in abutting relation to each other and spacing the floating upstream and downstream seats (60, 62) from each other a predetermined minimum distance. Each carrier (72, 74) has an annular base (76) adjacent one of the flow passages and a pair of spacers or guides (78, 80) secured to the base and extending from the base (76) in a direction axially of the flow passage. The spacers (78, 80) on opposed carriers are in abutting relation to each other and form a smooth continuation. An expanding gate assembly (28) fits between the spacers and moves between open and closed positions relative to the flow passages.

4 Claims, 5 Drawing Figures

SPACER CARRIERS FOR FLOATING SEATS IN GATE VALVES

BACKGROUND OF THE INVENTION

Heretofore, such as shown in U.S. Pat. No. 3,823,911 dated July 16, 1974, a gate valve structure has been provided in which spacers have been positioned between opposed seat rings for an expanding gate assembly to maintain a predetermined minimum clearance between the seat rings so that "sticking" or binding of the gate assembly particularly at a closed position is minimized thereby to permit a relatively low operating torque for opening the gate and moving the gate between open and closed positions.

The spacers shown in Pat. No. 3,823,911 fit between opposed floating seats to limit the movement of the seats toward the gate assembly. The spacers are connected by pins to the seat skirts and a floating movement of the seat skirts and associated seat rings is permitted although a certain predetermined minimum spacing is maintained between the opposed seat rings by the spacers. However, the mounting of the spacers within the valve chamber to the seats is sometime difficult as the assembly is performed within a relatively small valve chamber and accurate alignment of the spacers is necessary in order to position the pins.

DESCRIPTION OF THE INVENTION

The present invention is directed to spacer means to control the floating movement of the seats against the gate valve assembly for maintaining a predetermined minimum clearance between the seats so that "sticking" or binding of the gate assembly particularly at the fully closed position is minimized to permit a relatively low operating torque for "cracking" the gate from its fully closed position. The spacer arrangement to control this predetermined clearance between the seats includes a pair of separate, opposed generally identical carriers, one of the spacer carriers being on the upstream side of the valve chamber to limit inward movement of the upstream seat and the other spacer carrier being on the downstream side of the valve chamber to limit inward movement of the downstream seat. By having a separate pair of spacer carriers, the seats and spacer elements can be easily assembled within the valve body chamber.

The spacer arrangement is particularly adapted for use with a gate valve structure in which an expanding gate assembly is provided with the gate and segment carried thereby expanding outwardly away from each other at the fully closed position and with floating seats mounted for back and forth longitudinal movement relative to the gate assembly. If desired, the opposed spacer carriers may be secured to each other after thay are assembled in the valve chamber with the seats floating relative to the spacer carriers. However, it is not necessary to connect the opposed pair of spacer carriers to each other and they may be permitted to move relative to each other. If desired, the seats may be secured to the spacer carriers with the seats and associated spacers floating back and forth. In any of the above arrangements, the minimum clearance between the seats would be maintained by the abutting surfaces of the pair of spacer carriers.

BRIEF DESCRIPTION OF THE DRAWINGS

In the accompanying drawings, in which one of various possible embodiments of the invention is illustrated.

Figure 1:
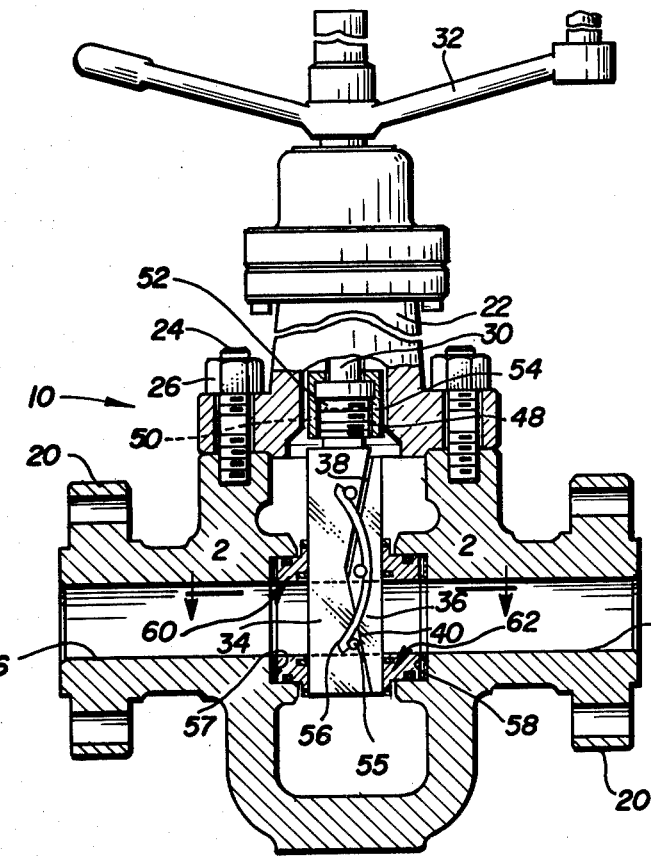
FIG. 1 is a sectional view, certain parts shown in elevation, of a gate valve structure embodying the present invention.

Referring now to the drawings for a better understanding of the invention, a gate valve structure is generally indicated 10 and includes a valve body generally designated 12 having a valve chamber 14 therein. Inlet flow passage 16 and outlet flow passage 18 communicate with valve chamber 14. Flanges 20 on the ends of valve body 12 may be suitably connected to a connecting pipeline or other flow system as is well known in the art. A bonnet 22 is connected by studs 24 and nuts 26 to the upper end of body 12.

A gate valve assembly generally indicated 28 is mounted within chamber 14 for movement between open and closed position relative to flow passages 16 and 18. A valve stem 30 is connected to gate assembly 28 and handwheel 32 is operatively connected to valve stem 30 for moving gate assembly 28 between closed and open positions upon rotation of handwheel 32 as is well known in the art.

Gate assembly 28 includes a gate element 34 and a segment 36. Gate element 34 and segment 36 are of complementary shape, segment 36 having a V-shaped face 38 while gate element 34 has a face 40 adapted to fit the V-shap ed face 38 of segment 36 and upon relative longitudinal movement between gate element 34 and segment 36 to expand gate assembly 28 outwardly. Suitable ports are provided in gate element 34 and segment 36 to align with flow passages 16 and 18 in an open position of gate assembly 28. Gate element 34 has a threaded projection 48 with an elongate slot 50 therein. Stem 30 has an elongate lug 52 fitting within slot 50. An internally threaded nut 54 is threaded on projection 48 and thereby connects stem 30 to gate element 34 for longitudinal movement. Lugs 55 extend from opposed sides of gate element 34 and segment 36 and springs 56 engaging lugs 55 continuously urge gate element 34 and segment 36 toward a collapsed or retracted position.

Formed in valve body 12 adjacent valve chamber 14 are annular recesses 57 and 58 which extend about respective flow passages 16 and 18. Respective upstream and downstream annular seats 60 and 62 are mounted within recesses 57 and 58 for floating back and forth movement. Upstream seat 60 and downstream seat 62 are identical and for the purposes of illustration only, upstream seat 60 is described in detail, it being understood that downstream seat 62 has similar parts indicated by similar numerals. Upstream seat 60 includes a metal seat ring 64 with an annular groove 66 in its front face. A face seal 68 is mounted within groove 66 and is adapted to engage in sealing relation the adjacent sealing surface of gate assembly 28. Face seal 68 may be formed of a suitable material, such as polytetrafluoroethylene. The rear face of seat 60 is stepped to form rear faces 67 and 67A. An outer groove 69 has an O-ring therein to seal against the adjacent valve body. A spring 71 is positioned between the rear face 67 of seat ring 64 and the adjacent valve body forming recess 57 to continuously urge seat 60 into sealing engagement with the adjacent sealing surface of gate assembly 28.

To hold seats 60 and 62 in a minimum spaced relation to each other, a pair of identical spacer carriers 72 and 74 are provided. Spacer carrier 72 is positioned adjacent upstream seat 60 and spacer carrier 74 is positioned adjacent downstream seat 62 thereby to form respective upstream and downstream spacer carriers 72 and 74. Spacer carriers 72 and 74 are identical and only upstream spacer carrier 72 is described in detail, it being understood that downstream spacer carrier 74 is identical with similar numerals being applied to similar parts.

Figure 2:
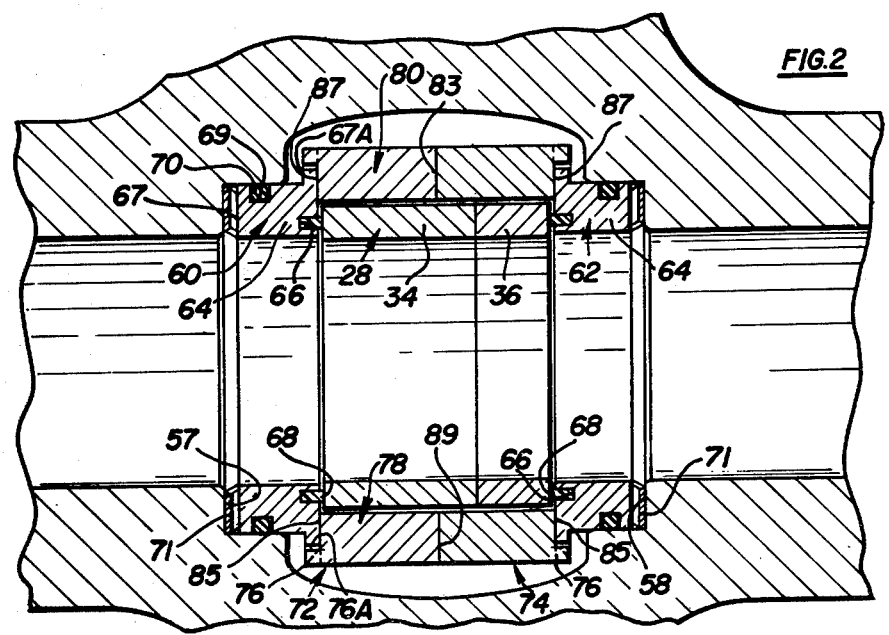
FIG. 2 is a longitudinal section looking generally along the lines 2—2 of FIG. 1 and showing the pair of opposed spacer elements positioned within the valve chamber with separate seats being mounted for floating movement.
Figure 4:
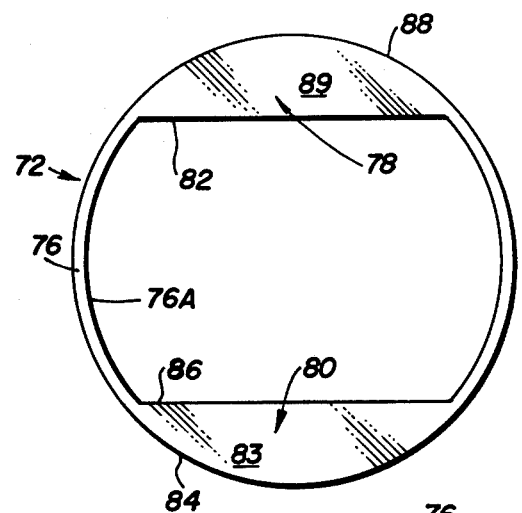
FIG. 4 is an opposite end view of the spacer carrier shown in FIG. 3.
Figure 3:
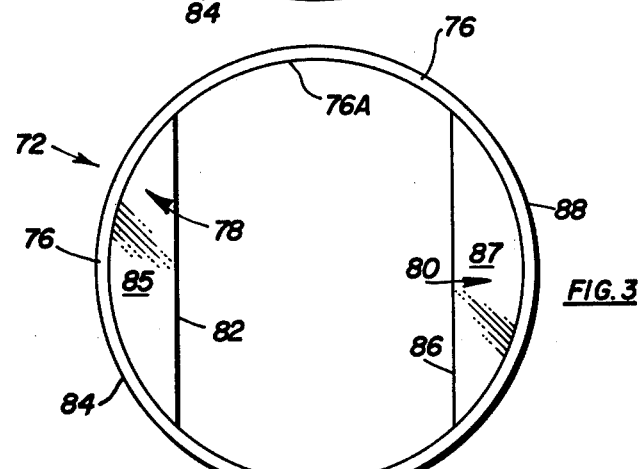
FIG. 3 is an end elevation of one of the spacer carriers removed from the valve body.
Figure 5:
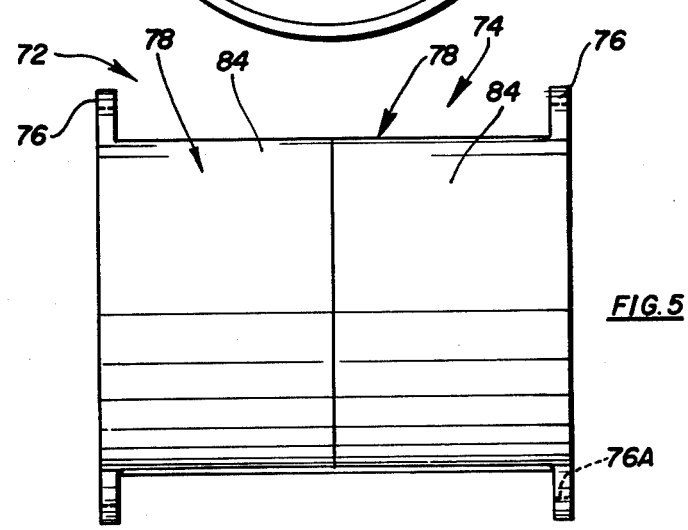
FIG. 5 is a side elevation of the pair of spacer carriers shown removed from the valve body and illustrated in abutting relation to each other.

Upstream spacer carrier 72 includes a base formed by ring 76 and a pair of guides or spacers 78 and 80 secured to the base and extending from the face of ring 76. Spacer 78 has a flat surface 82 providing an inner guiding surface and an outer generally arcuate surface 84. Spacer 80 has a guiding surface 86 facing opposed surface 82 and an outer arcuate surface 88. An end abutting surface of spacer 80 is illustrated at 83 and an end abutting surface of spacer 78 is illustrated at 89. The rear face of spacer 78 is shown at 85 and the rear of spacer 80 is illustrated at 87. Ring 76 is of a narrow width and has an inner circumference 76A of a diameter slightly greater than the outer diameter of seat 60 to receive seat 60 therein in abutting relation with faces 85 and 87 as shown in FIG. 2. Spacers 78 and 80 have their inner surfaces 82 and 86 spaced to receive gate assembly 28 therebetween as shown in FIG. 2. Spacer carriers 72 and 74 thus maintain a minimum clearance between seats 60 and 62. While seats 60 and 62 may move away from spacer carriers 72 and 74, seats 60 and 62 are limited in movement toward gate assembly 28 by surfaces 85 and 87 on spacer carriers 72 and 74.

To assemble seats 60 and 62 and spacer carriers 72 and 74, seats 60 and 62 are first inserted within recesses 57 and 58. Then, one of the spacer carriers 72 or 74 is inserted. Next, seats 60 and 62 are compressed against the associated springs 71 and the other spacer carrier 72 or 74 is then inserted. Seats 60 and 62 are positioned within the opening defined by ring 76 in abutting contact with respective surfaces 85 and 87. Springs 71 continuously urge seats 60 and 62 into abutting relation with surfaces 85 and 87 which in turn urge carriers 72 and 74 into abutting relation between surfaces 89 and 83.

It is to be understood that if desired, spacer carriers 72 and 74 could be secured to each other in abutting relation after assembled within the valve body. However, the arrangement as shown has been found to function satisfactorily. Also, it is possible that seats 60 and 62 could be secured to carriers 72 and 74 such as by bayonet lug arrangements or the like. In this manner, spacer carriers 72 and 74 would float back and forth but yet would provide a minimum spacing between seats 60 and 62.

What is claimed is:
1. A gate valve structure comprising:
a valve body having a valve chamber therein and axially aligned upstream and downstream flow passages communicating with the valve chamber;
a bonnet detachably connected to an upper end of the valve body over the valve chamber and permitting access to the valve chamber when removed;
a pair of opposed spacer carriers fitting within the valve chamber, one of the carriers being positioned adjacent the upstream flow passage and the other carrier being positioned adjacent the downstream flow passage, each spacer carrier including an annular base ring in alignment with the associated flow passage and a pair of generally parallel spacers extending from the ring in a direction axially of the flow passages, the spacers on one of said opposed carriers being aligned with and in abutting relation to the spacers on the other of said opposed carriers;
a gate mounted between the spacers for movement between open and closed positions;
and an annular seat around each of the flow passages between the valve body and adjacent spacer carrier for sealing against the gate in the closed position thereof, the seats being spaced from each other by said spacer carriers a predetermined minimum distance.

2. A gate valve structure comprising:
a valve body having a valve chamber therein and axially aligned upstream and downstream flow passages communicating with the valve chamber, said valve body having a recess about each flow passage;
a bonnet connected to an upper end of the valve body;
a pair of opposed spacer carriers fitting within the valve chamber, one of the carriers being positioned adjacent the upstream flow passage and the other carrier being positioned adjacent the downstream flow passage, each spacer carrier including a base and a pair of generally parallel spacers extending from the base in a direction axially of the flow passages, said spacers being spaced from each other in a direction transverse to the longitudinal axis of the flow passages, the spacers on one of said opposed carriers being aligned with and in abutting relation to the spacers on the other of said opposed carriers;
an expanding gate valve assembly mounted between the spacers for movement between open and closed positions, said gate valve assembly including a gate and a segment carried by the gate;
and an annular seat in each of the body recesses between the valve body and adjacent spacer carrier for sealing against the gate assembly in the closed position thereof, said seats being mounted within said recesses for floating longitudinal movement relative to the spacer carriers and being limited in inward movement toward the gate assembly by the spacer carriers thereby to space the seats from each other a predetermined minimum distance.

3. A gate valve structure as set forth in claim 2 wherein the face of each of said spacer carriers comprises a ring integrally connected to the pair of associated spacers adjacent the outer circumference of the spacers, said ring being of a relatively narrow width and having an inner circumference slightly less than the outer circumference of the mounted seat so that the seat is secured within the ring and abuts against the rear face of the pair of spacers for limiting the movement of the seat toward the gate assembly.

4. A gate valve structure as set forth in claim 3 wherein a spring between the seat and valve body continuously urges the seat into engagement with the rear face of the spacers.

* * * * *